(12) United States Patent
You

(10) Patent No.: US 9,254,816 B2
(45) Date of Patent: Feb. 9, 2016

(54) SEAT BELT WEBBING GUIDE

(71) Applicant: Autoliv Development AB, Vargarda (SE)

(72) Inventor: Byoung Gae You, Wonju-si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/419,958

(22) PCT Filed: Aug. 30, 2013

(86) PCT No.: PCT/KR2013/007806
§ 371 (c)(1),
(2) Date: Feb. 6, 2015

(87) PCT Pub. No.: WO2014/038817
PCT Pub. Date: Mar. 13, 2014

(65) Prior Publication Data
US 2015/0210246 A1    Jul. 30, 2015

(30) Foreign Application Priority Data

Sep. 6, 2012  (KR) .................. 10-2012-0098845

(51) Int. Cl.
*B60R 22/24*    (2006.01)
*B60R 22/18*    (2006.01)

(52) U.S. Cl.
CPC ......... *B60R 22/24* (2013.01); *B60R 2022/1831* (2013.01)

(58) Field of Classification Search
CPC  B60R 22/20; B60R 22/24; B60R 2022/1818; B60R 2022/1831
See application file for complete search history.

(56) References Cited

U.S. PATENT DOCUMENTS

| 5,918,903 | A  | * | 7/1999  | Ito ........................ | B60R 22/24 280/801.1 |
| 6,354,628 | B1 |   | 3/2002  | Deb et al. | |
| 6,478,334 | B1 |   | 11/2002 | Desmarais et al. | |
| 6,641,222 | B2 | * | 11/2003 | Specht ................... | B60R 22/24 280/801.1 |
| 6,662,426 | B2 | * | 12/2003 | Ito ........................ | B60R 22/18 29/527.2 |
| 7,192,057 | B2 | * | 3/2007  | Moendel ................ | B60R 22/18 280/801.1 |
| 7,416,217 | B2 | * | 8/2008  | Cord ...................... | B60R 22/24 280/801.1 |
| 2002/0000717 | A1 |   | 1/2002  | Ito | |

FOREIGN PATENT DOCUMENTS

| DE | 3103114 A1 * | 8/1982 | ............. B60R 22/24 |
| DE | 3200118 A1 * | 7/1983 | ............. B60R 22/24 |

(Continued)

OTHER PUBLICATIONS

International Search Report for PCT/KR2013/007806, ISA/KR, mailed Nov. 11, 2013.

*Primary Examiner* — Laura Freedman
(74) *Attorney, Agent, or Firm* — Harness, Dickey & Pierce, P.L.C.

(57) ABSTRACT

A seat belt webbing guide includes a main body having a slot through which seat belt webbing passes and a through hole through which a mounting bolt passes. The webbing guide includes at least one rib that is formed as a single unit with the main body along a circumferential surface of the through hole. The at least one rib extends inwardly in a radial direction of the through hole to a central axis of the through hole. At least a portion of the at least one rib is protruded from a surface of the main body toward a head of the mounting bolt.

5 Claims, 3 Drawing Sheets

(56) References Cited

FOREIGN PATENT DOCUMENTS

| | | | | |
|---|---|---|---|---|
| DE | 4108123 | A1 * | 9/1991 | ............. B60R 22/24 |
| DE | 29804260 | U1 * | 7/1998 | ............. B60R 22/24 |
| KR | 10-2002-0356213 | B1 | 10/2002 | |
| KR | 10-2006-0068930 | A | 6/2006 | |
| SE | 10344466 | A1 * | 5/2005 | ............. B60R 22/24 |

* cited by examiner

US 9,254,816 B2

SEAT BELT WEBBING GUIDE

CROSS-REFERENCE TO RELATED APPLICATIONS

This application is a 371 U.S. National Stage of International Application No. PCT/KR2013/007806, filed Aug. 30, 2013, which claims priority to Korean Patent Application No. 10-2012-0098845, filed Sep. 6, 2012. The entire disclosures of each of the above applications are incorporated herein by reference.

TECHNICAL FIELD

The present invention relates to a webbing guide for guiding webbing used in a seat belt device, and more particularly, to a webbing guide for guiding webbing that supports a body of a passenger, in a seat belt device for protecting the passenger during a vehicle accident.

BACKGROUND ART

In general, a seat belt for protecting a passenger is installed in a vehicle, and the seat belt includes seat belt webbing extending from a fixing portion mounted at a lower side portion of a vehicle seat, passing through a webbing guide, and being wound by a retractor with a predetermined force.

A tongue of the seat belt is mounted at one end of the seat belt webbing extending between the fixing portion and the webbing guide, and multiple sections of the seat belt webbing extending between the webbing guide and the retractor are slidably inserted in a vertical direction into a guide holder mounted at an inner side of the vehicle.

Also, a buckle to be coupled to the tongue is connected to the fixing portion mounted in the lower side portion of the seat.

DISCLOSURE OF INVENTION

Technical Problem

Accordingly, when a passenger pulls the tongue of the seat belt with a predetermined force or more in order to fasten the seat belt, the belt webbing which is wound on the retractor is unwound, thereby extending the total length of the seat belt. After the tongue is coupled to the buckle, if the passenger lets go the seat belt, which he or she was pulling, the webbing of the seat belt is pulled by the refractor with a predetermined force so that the belt extending between the tongue and the fixing portion restricts the waist part of the passenger, and the seat belt webbing extending between the tongue and the webbing guide restricts the chest part of the passenger, thereby restricting the upper body of the passenger with a predetermined force.

According to the seat belt of the conventional art, in the event of a collision of a vehicle, the webbing of the belt is unwound at a predetermined speed or higher, and the refractor blocks further unwinding with a centrifugal force to thereby prevent the passenger from being thrown from the vehicle.

Meanwhile, the webbing guide for guiding a path of the webbing of the seat belt is installed inside the vehicle by using a predetermined fixing unit; as the fixing unit for fixing the webbing guide inside the vehicle, a head of a bolt having a screw thread that presses the webbing guide to fix the webbing guide in the vehicle is generally used. Here, when the webbing guide according to the conventional art is fixed in a vehicle by using the bolt, the webbing guide is rotatably mounted along an axis direction of the bolt at the same time, and a bushing is additionally installed on a contact surface between the webbing guide and the head of the bolt in order to reduce friction. However, when the bushing is additionally installed on the webbing guide, the number of components increases, and noise is caused due to surface contact between the bushing and a head of the bolt.

Solution to Problem

The basic objective of the present invention is to solve the problems in the conventional art described above. In detail, one objective of the present invention is to provide a seat belt webbing guide capable of maintaining an excellent coupling force between a mounting bolt, which is a mounting unit, and a webbing guide when mounting seat belt webbing in a vehicle and reducing noise which may be caused due to friction between the mounting bolt and the webbing guide at the same time.

Another objective of the present invention is to provide a method of reducing or preventing noise between the webbing guide and the mounting bolt by not installing a bushing at the seat belt webbing guide.

To achieve the objectives described above, a seat belt webbing guide according to an embodiment of the present invention comprises a main body including a slot through which seat belt webbing passes and a through hole through which a mounting bolt passes, wherein the seat belt webbing guide includes at least one rib that is formed as a single unit with the main body along a circumferential surface of the through hole, wherein the at least one rib extends inwardly in a radial direction of the through hole to a central axis of the through hole, and at least a portion of the at least one rib is protruded from a surface of the main body toward a head of the mounting bolt.

Here, according to the seat belt webbing guide according to an embodiment of the present invention, the at least one rib may include a free end portion extending inwardly in a radial direction of the through hole, wherein the free end portion of the rib is protruded from the surface of the main body at a maximum height.

Selectively, an intermediate portion of the at least one rib extending from the circumferential surface of the through hole to the free end portion may be protruded from the surface of the main body at a maximum height.

Selectively, the at least one rib may be separated from the surface of the main body in an opposite direction from the head of the mounting bolt and is formed as a single unit with the circumferential surface of the through hole.

Meanwhile, the seat belt webbing guide according to an embodiment of the present invention may further include an extension portion that is separated from the at least one rib in a circumferential direction with a separation portion included between the extension portion and the rib along the circumferential surface of the through hole.

Here, a thickness of the extension portion is thicker than a thickness of the at least one rib, and is the same as a thickness of the main body.

Advantageous Effects of Invention

According to the seat belt webbing guide of the present invention as described above, effects may be obtained as follows.

First, a rib is formed in a portion where a mounting bolt and a webbing guide contact each other, as a single unit with a main body of the webbing guide, and thus, a bushing is not required, and thus the number of components may be reduced.

Secondly, despite the absence of a bushing, noise between the mounting bolt and the webbing guide is reduced by using the rib that is formed as a single unit with the main body of the webbing guide.

Thirdly, a contact surface between the rib formed as a single unit with the main body of the webbing guide and the mounting bolt is minimized, thereby significantly reducing noise.

Fourthly, the rib is extended inwardly in a radial direction of the through hole toward a central axis of the through hole of the webbing guide, and thus, compared to a case where a rib extends outwardly in a radial direction of the through hole away from a central axis of the through hole, a size of a portion for integrally connecting the rib and the webbing guide is increased, thus improving strength of the rib.

Fifthly, at least a portion of the rib is protruded from the surface of the main body toward the head of the mounting bolt, and thus, when the mounting bolt tightens the rib via screw-coupling, the mounting bolt and the webbing guide are elastically coupled.

EXPLANATION OF REFERENCE NUMERALS DESIGNATING THE MAJOR ELEMENTS OF THE DRAWINGS

Figure 1:
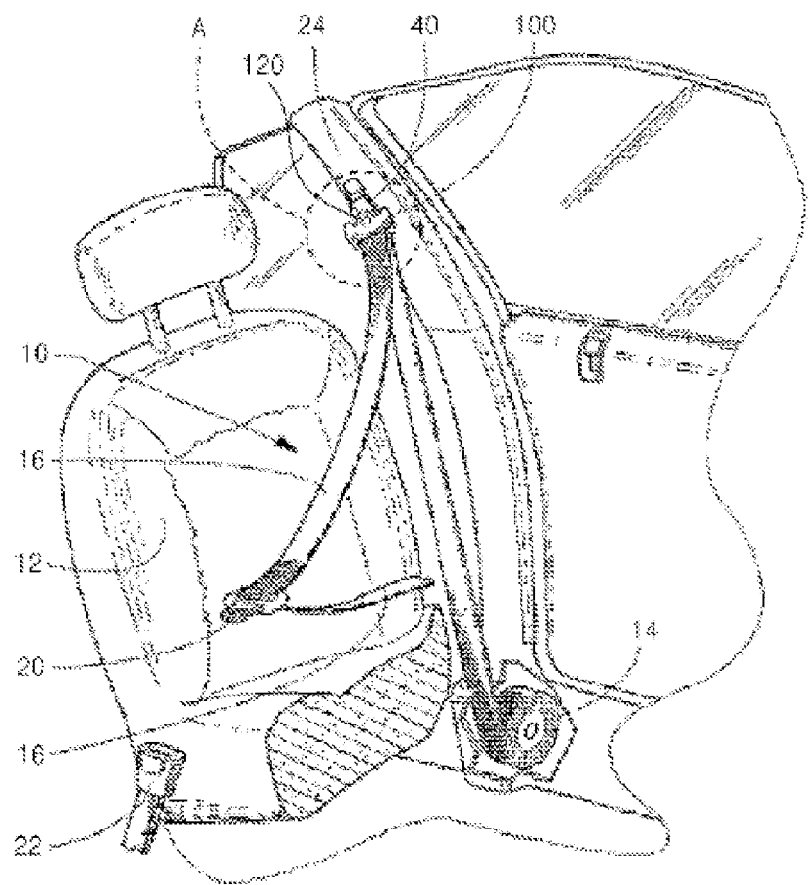
FIG. 1 is a schematic view of a seat belt device including a seat belt webbing guide, according to an embodiment of the present invention.

10: seat belt device 12: seat
14: retractor 16: webbing
20: tongue 22: buckle
24: B-pillar 100: webbing guide
101: surface 102: guide main body
104: through hole 105: internal surface of extension portion
106: extension portion 107: separation portion
108: rib 112: protrusion portion
120: mounting bolt 122: bolt head
124: washer portion 126: screw portion
132: central axis

BEST MODE FOR CARRYING OUT THE INVENTION

Hereinafter, the present invention will be described in detail with reference to the attached drawings. In the drawings, sizes of particular portions may be extended for promoting understanding of the present invention. Accordingly, sizes and proportions of elements are not necessarily limited to the drawings of the present invention.

FIG. 1 is a schematic view of a seat belt device 10 including a seat belt webbing guide 100, according to an embodiment of the present invention. Referring to FIG. 1, the seat belt device 10 is a device for protecting a passenger sitting on a seat of a vehicle.

The seat belt device 10 includes seat belt webbing 16 having an elongated shape and including a first fixing portion and a second fixing portion and a retractor 14 connected to an end portion of the seat belt webbing from the first fixing portion or the second fixing portion in order to wind or unwind the seat belt webbing 16.

Also, the seat belt device 10 according to the current embodiment of the present invention includes a tongue 20 for locking the seat belt webbing 16, a buckle 22 that is connected to the tongue 20 to fix the seat belt webbing 16 across the upper body of the passenger who has sit on a seat 12, and the seat belt webbing guide 100 mounted in the vehicle to guide the seat belt webbing 16.

The seat belt webbing guide 100 is mounted on a B-pillar 24 disposed substantially at a side of the seat 12, wherein an adjusting type mounting unit 40 is installed in the B-pillar 24 and the webbing guide is coupled to the adjusting type mounting unit 40 via a mounting bolt 120 so as to be mounted in a vehicle. The webbing guide 100 is rotatably coupled with respect to a central axis of the mounting bolt 120.

Mode for the Invention

Figure 2:
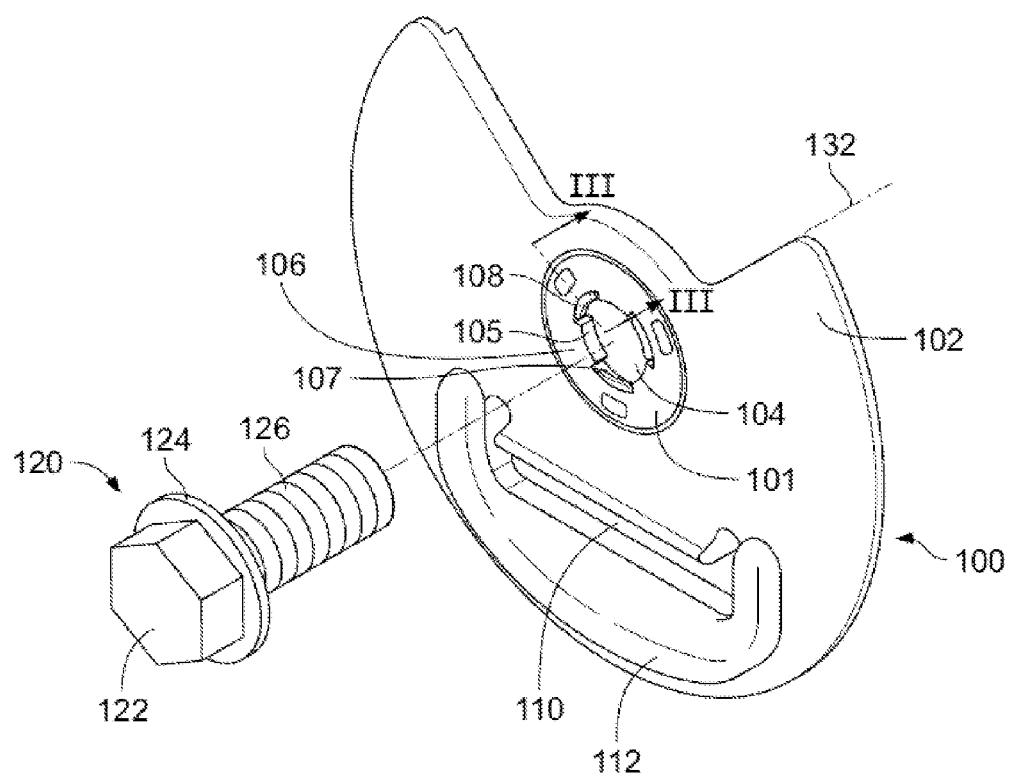
FIG. 2 is a disassembled perspective view illustrating a coupling relationship between a seat belt webbing guide and a mounting bolt, according to an embodiment of the present invention.

FIG. 2 is a disassembled perspective view illustrating a coupling relationship between a seat belt webbing guide and a mounting bolt, according to an embodiment of the present invention. Referring to FIG. 2, the main body 102 of the seat belt webbing guide 100 has an overall disk shape from which a partial upper portion is removed.

Also, the seat belt webbing guide 100 includes a slot 110 formed in a lower portion, through which the seat belt webbing 16 passes. Also, the seat belt webbing guide 100 includes a through hole 104, through which the mounting bolt 120 passes, in a portion above the slot 110. The through hole 104 has a diameter such that the mounting bolt 120 may pass therethrough.

Meanwhile, at least one rib 108 is formed as a single unit with the main body 102 of the webbing guide 100 along the circumferential surface of the through hole 104.

Meanwhile, the at least one rib 108 inwardly extends in a radial direction of the through hole 104 from an internal circumferential surface of the through hole 104 to a central axis 132 of the through hole 104. Also, an extension portion 106 that is separated from the at least one rib 108 in a circumferential direction is formed in the seat belt webbing guide 100, with the separation portion 107 included between the extension portion and the rib along the circumferential surface of the through hole 104.

The extension portion 106 has a thicker thickness than the at least one rib 108. Meanwhile, the extension portion 106 has substantially the same thickness as the main body 102 of the seat belt webbing guide 100.

Figure 3:
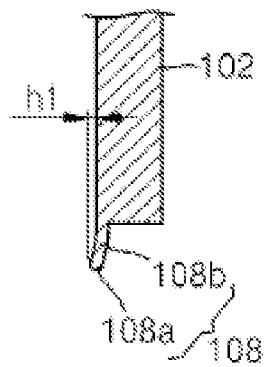
FIG. 3 is a cross-sectional view illustrating a rib cut along a line III-III of FIG. 2, according to an embodiment of the present invention.

FIG. 3 is a cross-sectional view illustrating a rib 108 cut along a line III-III of FIG. 2, according to an embodiment of the present invention. Referring to FIGS. 2 and 3, at least a portion of the rib 108 is protruded from a surface of the main body 102 toward a bolt head 122 of the mounting bolt 120 at a height h1. In detail, the rib 108 formed as a single unit with the main body 102 includes a curved extension portion 108b that is connected to the main body 102 and is curved and extended and a free end portion 108a extending inwardly in a radial direction of the through hole 104, the free end portion 108a of the rib 108 being protruded from the surface of the main body 102 at a maximum height h1.

Figure 4:
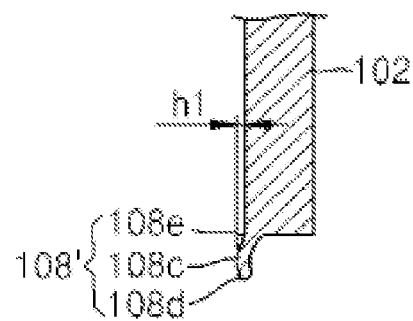
FIG. 4 is a cross-sectional view illustrating a rib cut along the line III-III of FIG. 2, according to another embodiment of the present invention.

FIG. 4 is a cross-sectional view illustrating a rib 108' cut along the line III-III of FIG. 1, according to another embodiment of the present invention. Referring to FIGS. 2 and 4, at least a portion of the rib 108' is protruded from a surface of the main body 102 toward a bolt head 122 of the mounting bolt 120 at a height h1. In detail, the rib 108' formed as a single unit with the main body 102 includes a connection portion 108e that is connected to and extends from the main body 102 and a free end portion 108d extending inwardly in a radial direction of the through hole 104, and a center portion of the rib 108' extending from a circumferential surface of the through hole 104 to the free end portion 108d forms an intermediate protrusion portion 108c, wherein the intermediate protrusion portion 108c is protruded from the surface of the main body 102 at the maximum height h1.

Figure 5:
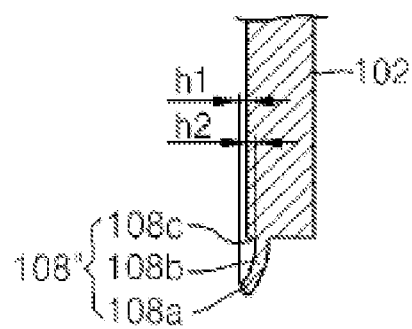
FIG. 5 is a cross-sectional view illustrating a rib cut along the line III-III of FIG. 2, according to another embodiment of the present invention.

FIG. 5 is a cross-sectional view illustrating a rib 108" cut along the line III-III of FIG. 2, according to another embodiment of the present invention. Referring to FIGS. 2 and 5, at least a portion of the rib 108" is protruded from a surface of the main body 102 toward a bolt head 122 of the mounting bolt 120 at a height h1. In detail, the rib 108" formed as a single unit with the main body 102 includes a step portion 108c that is connected to the main body 102 such that it is displaced and separated from the surface of the main body 102 in an opposite direction from the bolt head 122 of the mounting bolt 120 at a height h2, and a curved extension portion 108b, and a free end portion 108a extending inwardly in a radial direction of the through hole 104. Also, the free end portion 108a of the rib 108" is protruded from the surface of the main body 102 at the maximum height h1.

The step portion 108c may have an appropriate size to accommodate a washer portion 124 of the mounting bolt 120.

Referring to FIGS. 3 through 5 and FIG. 2 together, when the mounting bolt 120 is coupled to the seat belt webbing guide 100 through the through hole 104 of the seat belt webbing guide 100, a portion of the ribs 108, 108' and 108" that is protruded the most from the surface of the main body to the bolt head of the mounting bolt contacts the washer portion 124 of the bolt head 122 of the mounting bolt 120.

FIG. 1 is a schematic view illustrating a seat belt device including a seat belt webbing guide 100 according to an embodiment of the present invention, which is mounted in a vehicle.

Referring to FIG. 1, the seat belt webbing guide 100 in which a seat belt webbing 16 is passed through a slot 110 is mounted in a B-pillar 24 of a vehicle via a mounting bolt 120. In order to adjust a height of a webbing guide, the webbing guide 100 is mounted in the B-pillar 24 by using the adjusting type mounting unit 40. A vehicle passenger may adjust a guide position of the webbing according to his or her height by manipulating a coupling pin.

While this invention has been particularly shown and described with reference to embodiments thereof, it will be understood by those of ordinary skill in the art that various changes in form and details may be made therein without departing from the spirit and scope of the invention as defined by the appended claims.

In particular, while a webbing guide for a seat belt device according to the present invention has been described as being installed in a driver's seat in a vehicle in a front left side, the scope of the present invention is not limited thereto, and the present invention may also be used in a vehicle where a driver's seat is installed in the front right side or may be used for driver's seats of industrial machinery such as an excavator or a crane. Therefore, the scope of the invention is defined not by the detailed description of the invention but by the appended claims.

INDUSTRIAL APPLICABILITY

The present invention is industrially applicable to the field of the motor vehicle.

The invention claimed is:

1. A seat belt webbing guide comprising:
   a main body including a slot through which seat belt webbing passes and a through hole through which a mounting bolt passes; and
   at least one rib formed as a single unit with the main body along a circumferential surface of the through hole, the at least one rib extends inwardly in a radial direction of the through hole to a central axis of the through hole,
   wherein at least a portion of the at least one rib is protruded from a surface of the main body toward a head of the mounting bolt.

2. The seat belt webbing guide of claim 1, wherein the at least one rib includes a free end portion extending inwardly in a radial direction of the through hole, wherein the free end portion of the at least one rib is protruded from the surface of the main body at a maximum height.

3. The seat belt webbing guide of claim 1, wherein the at least one rib includes a free end portion extending inwardly in a radial direction of the through hole, and
   wherein a center portion of the at least one rib extending from the circumferential surface of the through hole to the free end portion is protruded from the surface of the main body at a maximum height.

4. The seat belt webbing guide of claim 1, further comprising an extension portion that is separated from the at least one rib in a circumferential direction with a separation portion included between the extension portion and the rib along the circumferential surface of the through hole.

5. The seat belt webbing guide of claim 4, wherein a thickness of the extension portion is thicker than a thickness of the at least one rib, and is the same as a thickness of the main body.

* * * * *